US008805198B2

(12) United States Patent
Mizuochi

(10) Patent No.: US 8,805,198 B2
(45) Date of Patent: Aug. 12, 2014

(54) OPTICAL TRANSMISSION AND RECEPTION SYSTEM, OPTICAL TRANSMITTING AND RECEIVING APPARATUS, AND OPTICAL TRANSMISSION AND RECEPTION METHOD

(75) Inventor: Takashi Mizuochi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 353 days.

(21) Appl. No.: 13/202,001

(22) PCT Filed: Apr. 13, 2009

(86) PCT No.: PCT/JP2009/057464
§ 371 (c)(1),
(2), (4) Date: Aug. 17, 2011

(87) PCT Pub. No.: WO2010/119499
PCT Pub. Date: Oct. 21, 2010

(65) Prior Publication Data
US 2011/0299852 A1 Dec. 8, 2011

(51) Int. Cl.
H04B 10/00 (2013.01)
H04B 10/04 (2006.01)
H04B 10/12 (2006.01)
H04B 10/06 (2006.01)

(52) U.S. Cl.
USPC ........... 398/140; 398/182; 398/183; 398/186; 398/192; 398/193; 398/194; 398/202; 398/208

(58) Field of Classification Search
CPC ........ H04B 10/50; H04B 10/60; H04B 10/80; H04B 17/00; H04B 17/0002; H04B 17/004; H04B 7/18582
See application file for complete search history.

(56) References Cited

U.S. PATENT DOCUMENTS 7,711,218 B2    5/2010  Ojima et al.
7,970,008 B2    6/2011  Kisaka et al.
(Continued)

FOREIGN PATENT DOCUMENTS

JP    2006 270909    10/2006
JP    2006 295603    10/2006
(Continued)

OTHER PUBLICATIONS

Mizuochi, T., et al., "DQPSK Modulated Turbo Code FEC for Cable Capacity Upgrades," Technical Difest of Suboptic, WeB1.5, pp. 1-4, (2007).

(Continued)

Primary Examiner — Darren E Wolf
(74) Attorney, Agent, or Firm — Oblon, Spivak, McClelland, Maier & Neustadt, L.L.P.

(57) ABSTRACT

An optical transmission and reception system in which a plurality of tributary signals are converted into multilevel modulated light for transmission and reception. An apparatus for transmitting multilevel modulated light includes: FECs which perform error correction processing including addition of a tributary identifier; and a GEAR BOX which performs rate conversion on the processed signals. An apparatus for receiving multilevel modulated light includes: a 20G DQPSK REC which separates received multilevel modulated light into received tributary signals and outputs the signals to respective output systems; the GEAR BOX which performs rate conversion on the received tributary signals; the FECs which extract tributary identifiers from the received tributary signals; a TIM which compares tributary identifiers defined for the respective output systems in advance with the tributary identifies extracted; and a tributary selector which gives an instruction to change correspondence between the received tributary signals and the output systems if the result of comparison is a mismatch.

27 Claims, 3 Drawing Sheets

(56) References Cited

U.S. PATENT DOCUMENTS

| | | |
|---|---|---|
| 2006/0193640 A1 | 8/2006 | Katagiri et al. |
| 2007/0065157 A1 | 3/2007 | Katagiri et al. |
| 2008/0080860 A1 | 4/2008 | Katagiri |
| 2008/0225882 A1 | 9/2008 | Atsumi et al. |
| 2008/0232815 A1 | 9/2008 | Shioiri et al. |
| 2009/0028548 A1 | 1/2009 | Tamura et al. |
| 2009/0116839 A1 | 5/2009 | Kikuchi et al. |

FOREIGN PATENT DOCUMENTS

| | | |
|---|---|---|
| JP | 2007-142650 | 6/2007 |
| JP | 2008 92130 | 4/2008 |
| JP | 2008-177772 | 7/2008 |
| JP | 2008 227993 | 9/2008 |
| JP | 2009-33261 | 2/2009 |
| JP | 2009 55212 | 3/2009 |
| WO | WO 2007 001090 A1 | 1/2007 |
| WO | WO 2008/035769 A1 | 3/2008 |

OTHER PUBLICATIONS

International Search Report issued Jun. 9, 2009 in PCT/JP09/057464 filed Apr. 13, 2009.

Decision of a Patent Grant issued Jul. 17, 2012, in Japanese patent Application No. 2011-509100 ( with English-language translation).

OPTICAL TRANSMISSION AND RECEPTION SYSTEM, OPTICAL TRANSMITTING AND RECEIVING APPARATUS, AND OPTICAL TRANSMISSION AND RECEPTION METHOD

FIELD

The present invention relates to an optical transmission and reception system, an optical transmitting and receiving apparatus, and an optical transmission and reception method which electrically multiplex a plurality of optical signals and transmit the resultant as a single light wavelength.

BACKGROUND

For the purpose of increasing the transmission capacity of a wavelength division multiplexing optical transmission system, a method of narrowing the intervals of multiplexing wavelengths to increase the number of wavelengths for transmission use and a method of increasing the bitrate have been known. For example, consider the case of doubling the transmission capacity of a system that multiplexes signals having a bitrate of 10 Gb/s with 32 wavelengths at intervals of 50 GHz. According to the former method, the wavelength multiplexing portions are exchanged to narrow the wavelength intervals down to 25 GHz for 64-wavelength multiplexing. According to the latter method, the transmission capacity of the foregoing system can be doubled by making the bitrate of the signal to be carried by a wavelength twice, i.e., 20 Gb/s.

In one example of the latter method, two 10-Gb/s signals (signals having a bitrate of 10 Gb/s) are transmitted on a wavelength at 20 Gb/s by using Differential Quadrature Phase Shift Keying (DQPSK) for four-phase differential phase modulation. For example, according to the method described in Non Patent Literature 1 listed below, two optical transmission and reception modules (XFPs: 10 Gigabit Small Form Factor Pluggables) receive respective two different STM (Synchronous Transfer Mode)-64 signals (with a data rate of 10 Gb/s). Such two signals will be referred to as tributary signals. Then, an error correction LSI (Large Scale Integration) encodes each of the tributary signals, and a differential coder composed of a parallel prefix network encodes the signals further for electrical multiplexing. A DQPSK modulator modulates the electrically-multiplexed signal into a 20G DQPSK signal of 12.4 Gsymbol/s (=24.8 Gb/s) and sends it out.

When receiving a 20G DQPSK signal that is sent thus, a 20G DQPSK receiver composed of two one-bit delay interferometers in parallel extracts two electrical tributary signals from the received signal. The error correction LSI decodes the tributary signals, and the optical transmission modules (XFPs) send out the respective tributary signals decoded. Here, the 20G DQPSK receiver equally splits the 20G DQPSK signal through an optical coupler before the two one-bit delay interferometers convert information on phase differences with adjacent bits into intensity information, and differential optical receivers optically receive the respective intensities. The two one-bit delay interferometers decode respective different data signals with an optical phase of $\pi/4$ and $-\pi/4$, respectively.

The one-bit delay interferometers mentioned above require high optical phase accuracy and stability, whereas the optical phase may have errors due to internal factors (such as a change in composition) and external factors (such as a change in temperature and pressure). Phase stabilization control is therefore needed. In the phase stabilization control, it is not fixed which of the two tributary signals is decoded by which of the one-bit delay interferometers, nor is the logic (positive logic, inverted logic) fixed. To solve such a problem, according to the following Patent Literature 1, for example, a logic-tributary decision circuit is used to allow selection of the output destinations and logic of the two tributary signals.

CITATION LIST

Patent Literature

Patent Literature 1: Japanese Patent Application Laid-Open No. 2006-295603

Non Patent Literature

Non Patent Literature 1: T. Mizuochi, Y. Konishi, K. Ouchi, K. Onohara, K. Ishida, K. Shimizu, K. Kubo, S. Mitani, and H. Tagami, "DQPSK modulated turbo code FEC for cable capacity upgrades," Technical Digest of SubOptic2007, WeB1.5, Baltimore, May, 2007.

SUMMARY

Technical Problem

Since the method described in the foregoing Non Patent Literature 1 is predicated on the multiplexing of tributary signals of the same rate, there is a problem that no method is disclosed for multiplying tributary signals of different rates such as STM-64 (9.9532 Gb/s) and 10 GbE (Ethernet (registered trademark)) LAN (Local Area Network) PHY (physical layer) (10.312 Gb/s).

To multiplex tributary signals of different rates, it is needed to eliminate the unfixedness of the tributary signals. According to the method of eliminating the unfixedness of two tributary signals described in the foregoing Patent Literature 1, the logic-tributary decision circuit is needed. Consequently, there has been a problem of increased power consumption and circuit scale.

The present invention has been achieved in view of the foregoing, and it is an object thereof to provide an optical transmission and reception system, an optical transmitting and receiving apparatus, and an optical transmission and reception method that can multiplex tributary signals of different rates for optical modulation and demodulation and can avoid the unfixedness of the output destinations of the tributary signals while suppressing an increase in circuit scale.

Solution to Problem

In order to solve the above problem and in order to attain the above object, an optical transmission and reception system of the present invention includes a transmitting apparatus for converting a plurality of tributary signals into a single beam of multilevel modulated light for transmission, and a receiving apparatus for receiving multilevel modulated light and converts it into a plurality of tributary signals. Here, the transmitting apparatus, includes: error correction processing means for applying error correction coding processing to each individual one of the tributary signals, the error correction coding processing including addition of a tributary identifier for identifying a tributary; transmission-side rate conversion means for performing rate conversion by adding predetermined data to the signals given the error correction coding processing so that the signals have the same transmission rate; and multilevel modulation means for converting the signals rate-converted by the transmission-side rate conversion means into a single beam of multilevel modulated light. Additionally, the receiving apparatus, includes: multilevel modulated light receiving means for receiving multilevel modulated light, separating a received signal into tributary signals, and outputting the separated signals as received tributary signals to respective different output systems; reception-side rate conversion means for performing rate conversion by deleting the predetermined data from the received tributary signals; error correction decoding processing means for performing error correction decoding processing on the received tributary signals rate-converted by the reception-side rate conversion means and extracting the tributary identifiers from the received tributary signals or the rate-converted received tributary signals output system by output system; tributary detection means for retaining tributary identifiers defined for the respective output systems in advance as output system tributary identifiers, comparing the output system tributary identifier of each output system with the tributary identifier that is extracted from the received tributary signal output to the output system, and making a notification as to a match or mismatch as a result of comparison; and tributary select means for giving an instruction to change correspondence between the received tributary signals output from the multilevel modulated light receiving means and the output systems if the result of comparison is a mismatch. More additionally, the multilevel modulated light receiving means changes the correspondence between the received tributary signals to output and the output systems based on the instruction from the tributary select means.

Advantageous Effects of Invention

The optical transmission and reception system according to the present invention performs error correction coding on tributary signals of different rates before converting the rate(s) of the slower tributary signal(s) into the same rate as that of the faster tributary signal and modulating the signals into a single signal for output. When receiving a modulated signal, the optical transmission and reception system separates the signal into two tributary signals, performs error correction decoding on the separated tributary signals, and determines the output destinations of the tributary signals based on tributary-identifying identifiers that are obtained by the error correction decoding processing. This leads to the effect that it is possible to multiplex the tributary signals of different rates for optical modulation and demodulation, and avoid the unfixedness of the output destinations of the tributary signals while suppressing an increase in circuit scale.

DESCRIPTION OF EMBODIMENTS

Hereinafter, embodiments of the optical transmission and reception system, the optical transmitting and receiving apparatus, and the optical transmission and reception method according to the present invention will be described in detail with reference to the drawings. It should be noted that the present invention is not limited by these embodiments.

First Embodiment

Figure 1:
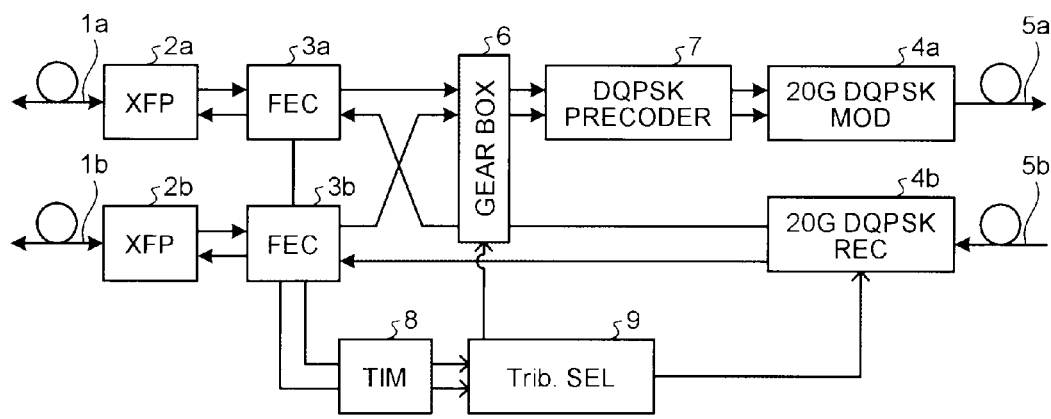
FIG. 1 is a diagram showing an example of the functional configuration of an optical transmitting and receiving apparatus according to a first embodiment.

FIG. 1 is a diagram showing an example of the functional configuration of a first embodiment of the optical transmitting and receiving apparatus according to the present invention. The optical transmitting and receiving apparatus according to the present embodiment multiplexes two tributary signals of different rates, i.e., an STM-64 signal 1$a$ which is a signal of 9.95328 Gb/s standardized by ITU-T (Telecommunication Union Telecommunication Standardization Sector) and a 10 GbE LAN PHY signal 1$b$ which is a signal of 10.3125 Gb/s standardized by IEEE (Institute of Electrical and Electronic Engineers) by multilevel modulation, and outputs the resultant as DQPSK transmission light 5$a$ with a single wavelength. The optical transmitting and receiving apparatus of the present embodiment also receives DQPSK reception light 5$b$ and separates the same into the STM-64 signal 1$a$ and the 10 GbE LAN PHY signal 1$b$.

As shown in FIG. 1, the optical transmitting and receiving apparatus of the embodiment includes: XFPs 2$a$ and 2$b$ which are optical transmission and reception modules for converting an optical signal into an electrical signal and converting an electrical signal into an optical signal; FECs (Forward Error Correction) 3$a$ and 3$b$ which perform error correction processing compliant with the OUT (Optical Channel Transport Unit)-2 frame standardized by ITU-T, and perform OTU-2 framing and OTU-2 deframing processing; a 20G DQPSK MOD (modulator) 4$a$; a 20G DQPSK REC (receiver) 4$b$; a rate conversion circuit (GEAR BOX) 6; a differential coding circuit (DQPSK PRECODER) 7; a trace ID (IDentifier) mismatch detection circuit (TIM) 8; and a tributary selector (Trib. SEL) 9. It should be noted that while the optical transmission and reception modules employed here are XFP modules in common use, they are not limited thereto and may be other optical transmission and reception modules.

The operation of the present embodiment will be described. Initially, a description will be given of the operation of multiplexing the tributary signals and transmitting the resultant as the DQPSK transmission light 5$a$ (transmission-side operation). The XFPs 2$a$ and 2$b$ convert the respective input STM-64 signal 1$a$ and 10 GbE LAN PHY signal 1$b$ into electrical signals, and output the converted electrical signals to the FECs 3$a$ and 3$b$, respectively. The FECs 3$a$ and 3$b$ perform error correction coding and OUT-2 framing processing on the respective input electrical signals, and output the processed signals to the rate conversion circuit 6. For example, given an error correction redundancy of 11%, the error correction coded signals are 11.0-Gb/s and 11.4-Gb/s signals, respectively.

The rate conversion circuit 6 adds extra bits (stuff bits or idle bits) to either one of the output signals of the respective FECs 3$a$ and 3$b$ that has a lower rate, i.e., the output signal of the FEC 3$a$ at every predetermined frame periods, thereby converting the signal into one having the same rate as that of the output of the FEC 3$b$. The rate conversion circuit 6 outputs the resultant to the differential coding circuit 7. The differential coding circuit 7 encodes the two signals in four-phase differential phases, for example, by the method described in 'Y. Konishi, K. Ishida, K. Kubo, and T. Mizuochi, "True PRBS transmission of DQPSK by differential precoder employing parallel prefix network," Technical Digest of OFC/NFOEC2006, OThR3, Anaheim, March,' and outputs the coded signals to the 20G DQPSK MOD 4*a*. The 20G DQPSK MOD 4*a* modulates the signals output from the differential coding circuit 7 into a DQPSK signal, and transmits the resultant to an optical transmission line as DQPSK transmission light 5*a* of 22.8 Gb/s (=11.4 Gsymbol/s).

Next, a description will be given of the operation of receiving DQPSK reception light 5*b* transmitted from another optical transmitting and receiving apparatus that has the same configuration as that of the optical transmitting and receiving apparatus of the present embodiment, and separating the light into tributary signals (reception-side operation). The 20G DQPSK REC 4*b* converts 22.8-Gb/s DQPSK reception light 5*b* received from the optical transmission line into two tributary electrical signals. The electrical signals are output to the FECs 3*a* and 3*b*, respectively. In doing so, the rate conversion circuit 6 removes extra bits from the tributary electrical signal to which the extra bits have been added (in this case, the signal that is output to the FEC 3*a*), and outputs the resultant to the FEC 3*a* with the original rate restored. The FECs 3*a* and 3*b* apply error correction decoding processing and OUT-2 deframing processing to the respective input electrical signals, and output the processed signals as the STM-64 signal 1*a* and the 10 GbE LAN PHY signal 1*b* through the XFPs 2*a* and 2*b*, respectively.

Here, the 20G DQPSK REC 4*b* shall include an optical coupler, two one-bit delay interferometers, and differential optical receivers. The optical coupler equally splits the input signal before the two one-bit delay interferometers convert information on phase differences with adjacent bits into intensity information and the differential optical receivers optically receive the intensities. According to the conventional technology, it is not fixed which of the tributary signals is output to which of the two one-bit delay interferometers of the 20G DQPSK REC 4*b*. That is, it is not fixed which of the tributary signals is output to which of the two output systems of the 20G DQPSK REC 4*b*.

In the present embodiment, in order to eliminate the unfixedness, the following operation is performed to allow tributary selection. Initially, to eliminate the unfixedness of the tributaries, the FECs 3*a* and 3*b* extract an ITU-T standardized identifier called Trace Identifier Mismatch (TIM), which has been embedded at the time of coding, by using an ordinary function of the OUT-2 deframing processing. The FECs 3*a* and 3*b* output the identifiers to the trace ID mismatch detection circuit 8. The trace ID mismatch detection circuit 8 shall retain Trace Identifier Mismatches (TIMs) that the respective FECs 3*a* and 3*b* use for coding. The trace ID mismatch detection circuit 8 compares the TIM that the FEC 3*a* uses for coding with the TIM that is extracted by the deframing processing of the FEC3*a*, compares the TIM that the FEC 3*b* uses for coding with the TIM that is extracted by the deframing processing of the FEC 3*b*, and outputs them to the tributary selector 9 as the result of comparison and trace ID (Identifier) mismatch information.

Suppose the trace ID mismatch information shows the result that the TIM that the FEC 3*a* uses for coding coincides with the TIM that is extracted by the deframing processing of the FEC 3*b* and the TIM that the FEC 3*b* uses for coding coincides with the TIM that is extracted by the deframing processing of the FEC 3*a*, i.e., the TIMs of the FECs 3*a* and 3*b* detected are inverse. In such a case, the tributary selector 9 sends a control signal to the 20G DQPSK REC 4*b*, instructing to change the receiving phase to invert the tributaries. Based on the control signal, the 20G DQPSK REC 4*b* changes the receiving phase so as to invert the output destinations.

Inverse logic prevents the FECs 3*a* and 3*b* from establishing OTU-2 frame synchronization. If the FECs 3*a* and 3*b* fail to establish OTU-2 frame synchronization, then the FECs 3*a* and 3*b* notify it to the tributary selector 9 through the trace ID mismatch detection circuit 8. The tributary selector 9 sends a control signal to the 20G DQPSK REC 4*b*, instructing to change the receiving phase to invert the received logic. Note that the tributary selector 9 can be constituted by a temperature control circuit of the 20G DQPSK REC 4*b* or the like.

While in FIG. 1 the tributary signals input to the FECs 3*a* and 3*b* are the STM-64 signal 1*a* and the 10 GbE LAN PHY signal 1*b*, respectively, the signals may be inverse in order. Both the tributary signals may even be slow STM-64 signals. Both may be fast 10 GbE LAN PHY signals. In order to deal with such cases, the rate conversion circuit 6 may be configured to convert the rate of only the slower signal if either one of the signals has a low rate, and make no operation if both the signals have the same rate. This makes it possible to reduce the circuit scale and power consumption of the rate conversion circuit 6.

In FIG. 1, only the slower tributary is passed through the rate conversion circuit 6 in a receiving operation. A transmission operation typically requires that both the tributary signals be passed through the rate conversion circuit 6 regardless of whether or not to perform rate conversion. In contrast, in a receiving operation, the rate of only the slower tributary may be restored. With such a configuration, the rate conversion circuit 6 has only to have a throughput three times the tributaries, while ordinary transmitting and receiving operations would need a throughput approximately four times. Which tributary is slower may be determined by the trace ID mismatch detection circuit 8 based on the TIMs. The trace ID mismatch detection circuit 8 then instructs the 20G DUSK REC 4*b* about the signal to be passed through the rate conversion circuit 6.

In the case of using only one of the two tributaries, for example, the 10 GbE LAN PHY signal may be assigned in advance to the port that is connected to the XFP 2*b*. If the STM-64 signal is added later, then the path through the XFP 2*a* automatically serves as the slower side. That is, the signal to be passed through the rate conversion circuit 6 in a receiving operation has only to be input to the FEC 3*a*. The path through the XFP 2*a* will also be used when a 10 GbE LAN PHY signal is added later. In such a case, passing through the XFP 2*a* will not entail rate conversion if the rate configuration circuit 6 is configured not to make an operation without a difference in rate.

It should be noted that while the foregoing description has been given with the 10 GbE LAN PHY signal and the STM-64 signal as the two tributary signals, other signals may be employed as the tributary signals. The same technology as described above may be applied to obtain the same effect even in cases with other bitrates, such as when transmitting and receiving two groups of 40-Gb/s signals with slightly different rates as an 80-Gb/s DQPSK signal or 80-Gb/s QPSK signal.

The modulation method is not limited to four-phase modulations such as DQPSK and QPSK, either. Other four-level modulation methods are also applicable. The application to modulation methods other than four-level modulation, with values more than four values such as eight-level and 16-level modulations, makes it possible to transmit and receive even more (more than two) tributary signals on a single wavelength. To process more than two tributary signals, there may be provided as many XFPs and FECs as the tributary signals. The rate conversion circuit 6 may perform rate conversion on the tributary signals other than the fastest tributary signal so as to match the rate of the fastest tributary signal.

The present embodiment has also dealt with the method of using TIMs (tributary ID mismatch signals) in order to eliminate the unfixedness of the tributaries. The signals to be used for eliminating the unfixedness of the tributaries are not limited thereto, and any signals may be used as long as the signals can identify the tributaries.

The present embodiment has dealt with the optical transmitting and receiving apparatus that has the functions of both an optical transmitting apparatus which performs a transmission operation (apparatus that transmits input tributary signals as 20G DQPSK light) and an optical receiving apparatus which performs a receiving operation (apparatus that receives 20G DQPSK light and outputs tributary signals). However, the optical transmitting apparatus and the optical receive apparatus may be configured as separate apparatuses. In such a case, the optical transmitting apparatus shall include the components needed for the foregoing transmission operation. The optical receiving apparatus shall include the components needed for the receiving operation.

As has been described above, in the present embodiment, the FECs 3a and 3b perform error correction coding on the tributary signals of different rates, and the rate conversion circuit 6 converts the rate of the slower tributary signal into the same rate as that of the faster tributary signal. The 20G DQPSK MOD 4a then modulates the resultant into a single signal for output. When receiving a modulated signal, the 20G DQPSK REC 4b separates the signal into two tributary signals. The FECs 3a and 3b perform error correction decoding on the separated tributary signals, and the trace ID mismatch detection circuit 8 instructs the 20G DQPSK REC 4b about the output destinations of the tributary signals based on the TIMs that are obtained by the error correction decoding processing. It is therefore possible to multiplex the tributary signals of different rates for optical modulation and demodulation, and avoid the unfixedness of the output destinations of the tributary signals while suppressing an increase in circuit scale.

Second Embodiment

Figure 2:
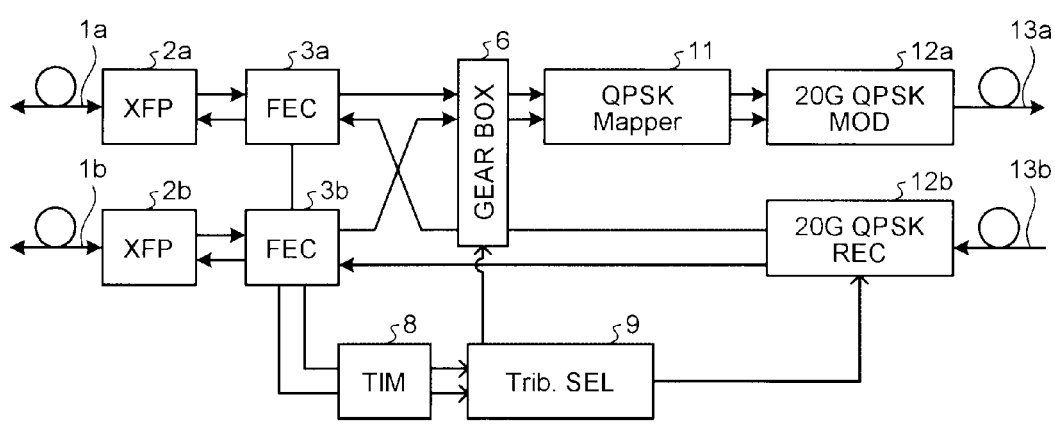
FIG. 2 is a diagram showing an example of the functional configuration of an optical transmitting and receiving apparatus according to a second embodiment.

FIG. 2 is a diagram showing an example of the functional configuration of a second embodiment of the optical transmitting and receiving apparatus according to the present invention. The first embodiment has dealt with the case where the STM-64 signal 1a and the 10 GbE LAN PHY signal 1b, or tributary signals, are transmitted as a 20-Gb/s DQPSK signal. The present embodiment will deal with a case where the tributary signals are transmitted as a Quadrature Phase Shift Keying (QPSK) signal (QPSK transmission light 13a, QPSK reception light 13b).

As shown in FIG. 2, the optical transmitting and receiving apparatus according to the present embodiment is the same as the optical transmitting and receiving apparatus of the first embodiment except in that the 20G DQPSK MOD 4a, the 20G DQPSK REC 4b, and the differential coding circuit (DQPSK PRECODER) 7 of the optical transmitting and receiving apparatus according to the first embodiment are replaced with a 20G QPSK MOD 12a, a 20G QPSK REC 12b, and a QPSK mapper 11, respectively. The components having the same functions as in the first embodiment will be designated by the same reference signs as in the first embodiment. A description thereof will be omitted.

The 20G DQPSK MOD 4a and the 20G QPSK MOD 12a can be constituted by the same circuit. The only difference lies in whether or not the electrical signals to be modulated are differentially coded. The 20G QPSK REC 12b includes, for example, a local oscillator laser, a 90-degree hybrid coupler, a twin photodiode, and a digital signal processing LSI (Large Scale Integration), and performs polarization diversity reception and homodyne detection of a QPSK signal.

Next, the operation of the present embodiment will be described. Since the components of the present embodiment other than the 20G QPSK MOD 12a, the 20G QPSK REC 12b, and the QPSK mapper 11 make the same operation as in the first embodiment, the following description will deal with differences from the first embodiment. Initially, a description will be given of a transmission operation. The rate conversion circuit 6 outputs the signals that are rate-converted as in the first embodiment to the QPSK mapper 11. The QPSK mapper 11 performs mapping based on the input signals. The 20G QPSK MOD 12a QPSK-modulates the mapped signals and outputs the resultant as a 20-Gb/s QPSK signal. In a reception operation, the 20G QPSK REC 12b separates the received 20-Gb/s QPSK signal into two tributary electrical signals and outputs the same to the rate conversion circuit 6 and the FEC 3b.

As in the first embodiment, if the signals to be output to the FEC 3a and the FEC 3b are inverse, the trace ID mismatch detection circuit 8 notifies it to the tributary selector 9. The tributary selector 9 transmits a control signal to instruct the 20G QPSK REC 12b about the tributaries. As in the first embodiment, if OTU-2 frame synchronization fails, the tributary selector 9 transmits a control signal to give an instruction for logic inversion. Based on the control signal, the digital signal processing LSI of the 20G QPSK REC 12b adjusts the phase in units of 90° to exchange the tributaries to be output or invert the logic.

In the present embodiment, the 20G QPSK MOD 12a, the 20G QPSK REC 12b, and the QPSK mapper 11 are provided instead of the 20G DQPSK MOD 4a, the 20G DQPSK REC 4b, and the differential coding circuit 7 of the optical transmitting and receiving apparatus of the first embodiment, respectively. The same effects as in the first embodiment can thus be obtained even when the two tributary signals are QPSK-modulated and transmitted as a single signal.

Third Embodiment

Figure 3:
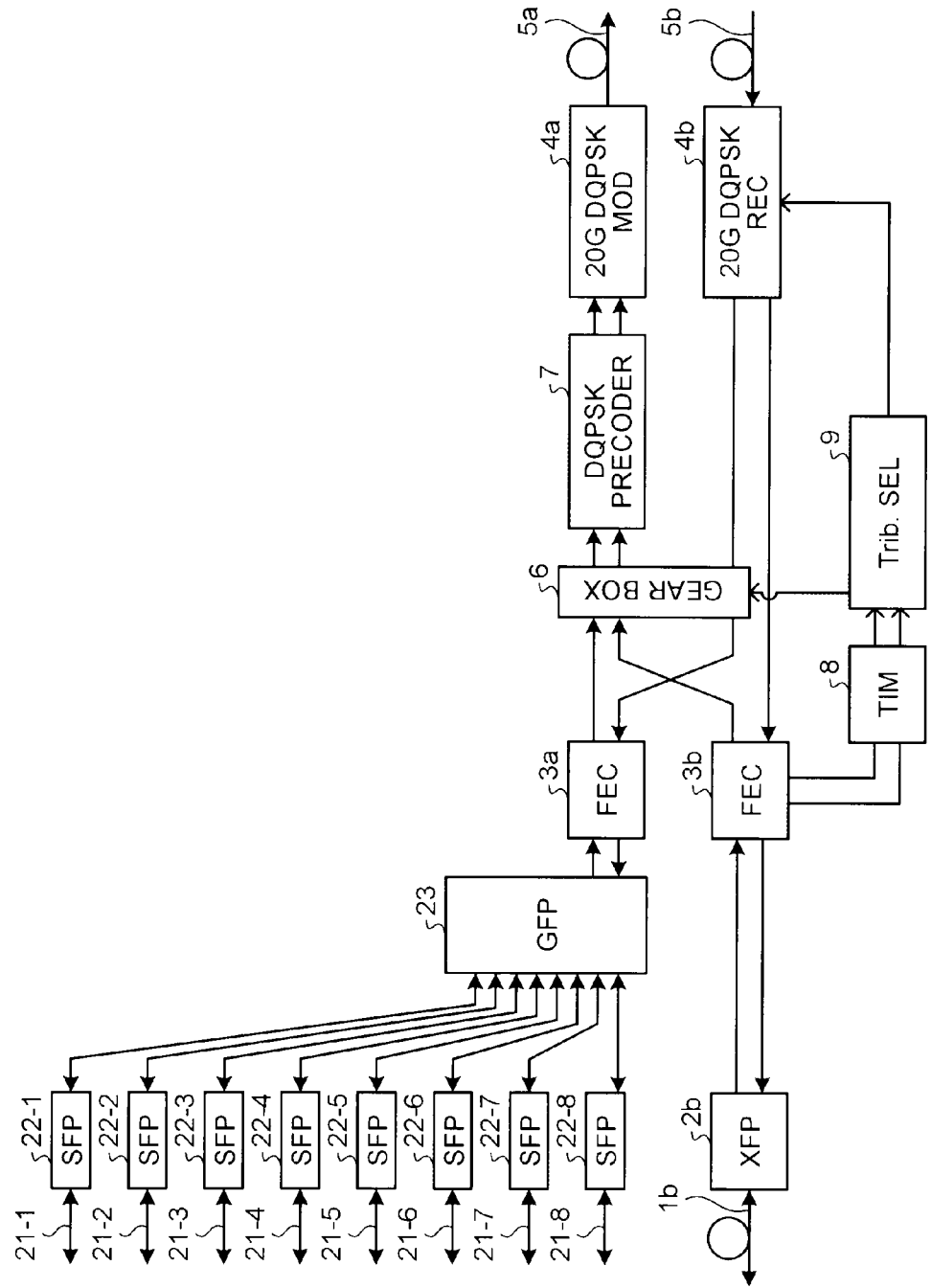
FIG. 3 is a diagram showing an example of the functional configuration of an optical transmitting and receiving apparatus according to a third embodiment.

FIG. 3 is a diagram showing an example of the functional configuration of a third embodiment of the optical transmitting and receiving apparatus according to the present invention. The first embodiment has dealt with the case where the STM-64 signal 1a and the 10 GbE LAN PHY signal 1b are the tributary signals. The present embodiment will deal with a case where 1 GbE (1 Gigabit Ethernet (registered trademark)) signals 21-1 to 21-8 are used as tributary signals instead of the STM-64 signal 1a.

The optical transmitting and receiving apparatus according to the present embodiment is the same as the optical transmitting and receiving apparatus of the first embodiment except in having optical transmission and reception modules or SFPs (Small Form factor Pluggables) 22-1 to 22-8 and a GFP 23, which is an LSI for performing multiplexing processing called GFP (Generic Framing Procedure), instead of the XFP 2a of the first embodiment. The components having the same functions as in the first embodiment will be designated by the same reference signs as in the first embodiment. A description thereof will be omitted.

In the transmission operation of the present embodiment, the SFPs 22-1 to 22-8 receive 1 GbE signals 21-1 to 21-8. The GFP 23 multiplexes the signals output from the SFPs 22-1 to 22-8 by the GFP method, and outputs the multiplexed signal to the FEC 3a. The processing of the FEC 3a and the subsequent processing are the same as in the first embodiment.

The reception operation of the present embodiment is the same as that of the first embodiment up to the error correction decoding of the FEC 3a. The GFP 23 separates the signal that is error correction decoded by the FEC 3a, and outputs the separated signals to the SFPs 22-1 to 22-8, respectively. The SFPs 22-1 to output the input signals as the 1 GbE signals 21-1 to 21-8, respectively. In other respects than those mentioned above, the operation of the present embodiment is the same as in the first embodiment.

The present embodiment has dealt with the case of performing DQPSK modulation as in the first embodiment. As with the second embodiment, however, the 200 DQPSK MOD 4a, the 20G DQPSK REC 4b, and the differential coding circuit 7 may be replaced with the 20G QPSK MOD 12a, the 200 QPSK REC 12b, and the QPSK mapper 11 for QPSK modulation. Other multilevel modulation methods may be used.

In the present embodiment, the 1 GbE signals 21-1 to 21-8 and the 10 GbE LAN PHY signal 1b are used as the tributary signal. This is not restrictive, however. A plurality of signals of different type than the 1 GbE signals 21-1 to 21-8 may be used and multiplexed as in the present embodiment before the multilevel modulation with the other tributary signal. Moreover, other tributary signals such as an STM-64 signal may be used instead of the GbE LAN PHY signal 1b.

In the present embodiment, the SFPs 22-1 to 22-8 and the GFP 23 are provided instead of the XFP 2a. The GFP 23 multiplexes the 1 GbE signals 21-1 to 21-8 that are received through the SFPs 22-1 to 22-8. The multiplexed signal and the 10 GbE LAN PHY signal 1b are transmitted as a single 20G DQPSK signal, and a 20G DQPSK signal is received and separated into the 10 GbE LAN PHY signal 1b and the 1 GbE signals 21-1 to 21-8. Consequently, with the multiplexed signal of the eight 1 GbE signals and the 10 GbE LAN PHY signal as the tributary signals, it is possible to multiplex the tributary signals for optical modulation and demodulation. It is also possible to prevent the unfixedness of the output destinations of the tributary signals while suppressing an increase in circuit scale.

Fourth Embodiment

Figure 4:
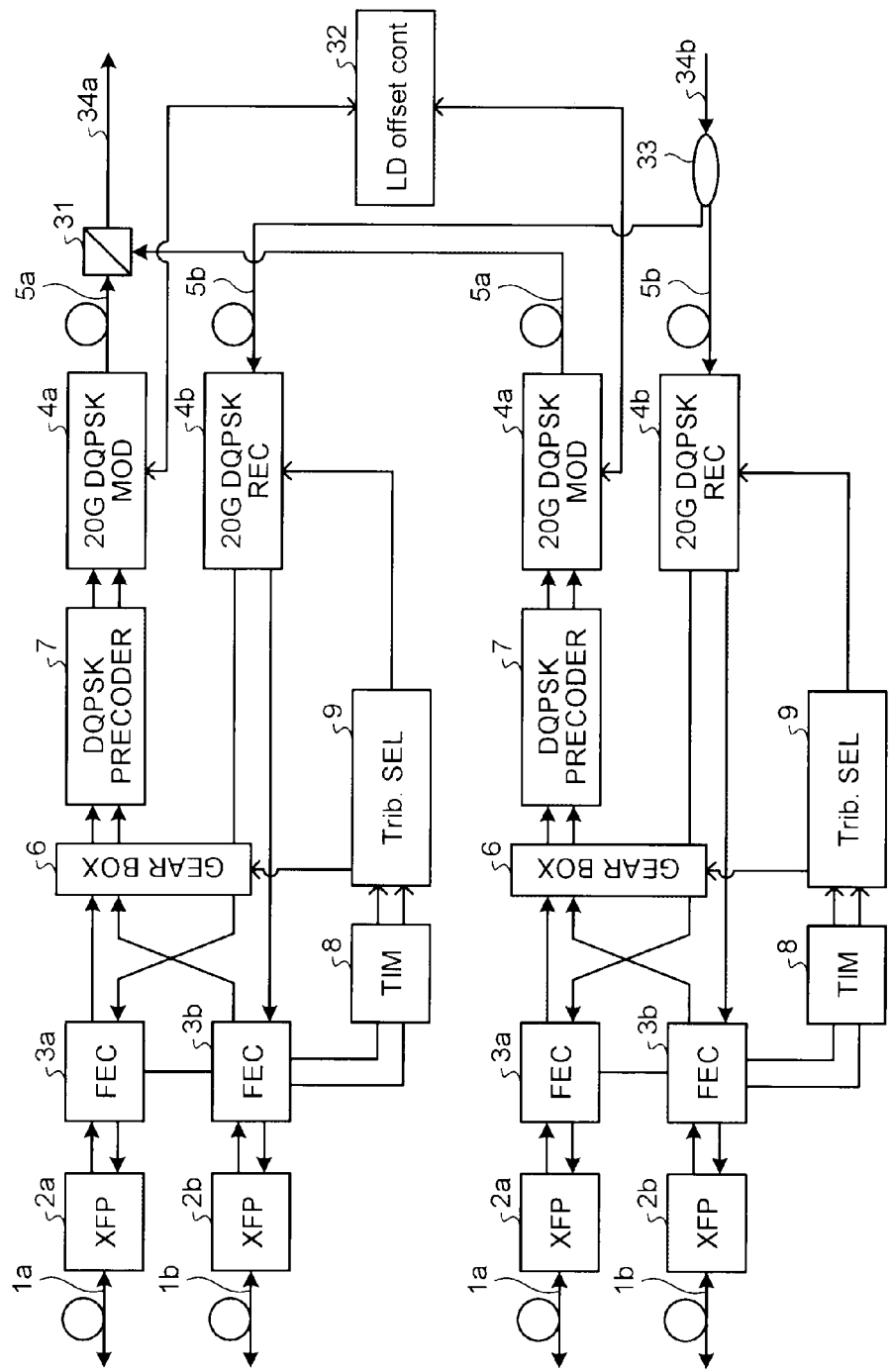
FIG. 4 is a diagram showing an example of the configuration of an optical transmission and reception system according to a fourth embodiment.

FIG. 4 is a diagram showing an example of the configuration of a fourth embodiment of the optical transmission and reception system according to the present invention. The optical transmission and reception system according to the present embodiment includes two optical transmitting and receiving apparatuses (upper and lower ranks in FIG. 4) identical to the optical transmitting and receiving apparatus of the first embodiment. The optical transmission and reception system further includes a polarization multiplexer 31, a wavelength offset controller (LD offset cont) 32, and an optical splitter 33. The same components as those of the first embodiment will be designated by the same reference signs as in the first embodiment. A description thereof will be omitted. The optical transmitting and receiving apparatuses make the same operation as in the first embodiment except in the following respects:

In the optical transmission and reception system of the present embodiment, the two optical transmitting and receiving apparatuses output the DQPSK transmission light 5a as in the first embodiment. The polarization multiplexer 31 multiplexes the two beams of DQPSK transmission light 5a output from the two optical transmitting and receiving apparatuses so that the beams are polarized orthogonal to each other. The polarization multiplexer 31 outputs the multiplexed signal as a 40-Gb/s optical signal 34a. The wavelength offset controller 32 controls the 20G DQPSK MODs 4a of the respective two optical transmitting and receiving apparatuses so that the two beams of DQPSK transmission light 5a are emitted with a certain frequency offset.

To receive a 40-Gb/s optical signal 34b that is transmitted from another optical transmission and reception system having the same configuration as that of the optical transmission and reception system according to the present embodiment, the optical splitter 33 initially splits the 40-Gb/s optical signal 34b into two DQPSK signals 5b and inputs the same into the two optical transmitting and receiving apparatuses, respectively.

The wavelength offset controller 32 controls the frequency offset between the beams of DQPSK transmission light 5a of the two optical transmitting and receiving apparatuses so as to match the bitrate (for example, 21.4 GHz for 20G DQPSK). Meanwhile, the optical splitter is an optical filter having a transmission characteristic with the bitrate cycles. One of the beams of DQPSK transmission light 5a has a center frequency that falls on a peak of the transmission characteristic. The other beam of DQPSK transmission light 5a has a center frequency that falls on a zero point of the transmission characteristic. Consequently, the DQPSK transmission light 5a falling on the peak of the transmission characteristic can be received by the differential optical receiver in the subsequent stage, while the other beam of DQPSK transmission light 5a falling on the zero point of the transmission characteristic disappears. The spectra of the respective beams of DQPSK transmission light overlap slightly in the tails, which interfere with each other to produce noise. The orthogonal polarization as in the present embodiment precludes the interference and minimizes noise production.

The present embodiment has dealt with the case of providing two optical transmitting and receiving apparatuses according to the first embodiment. This is not restrictive, however. Two optical transmitting and receiving apparatuses according to the second embodiment or the third embodiment may be provided, along with the polarization multiplexer 31, the wavelength offset controller (LD offset cont) 32, and the optical splitter 33, to perform polarization multiplexing as with the present embodiment.

In the present embodiment, the two optical transmitting and receiving apparatuses identical to the optical transmitting and receiving apparatus of the first embodiment are provided, along with the polarization multiplexer 31, the wavelength offset controller 32, and the optical splitter 33. The polarization multiplexer 31 polarizes and multiplexes the DQPSK transmission light 5a output from the two optical transmitting and receiving apparatuses, and outputs the resultant as the 40-Gb/s optical signal 34a. When receiving the 40-Gb/s optical signal 34b, the optical splitter 33 splits it into two optical signals and inputs the optical signals into the two optical transmitting and receiving apparatuses, respectively. The wavelength offset controller 32 controls the frequency offset between the wavelengths of the output signals of the two optical transmitting and receiving apparatuses. Consequently, the effects of the first embodiment are obtained while it is possible to multiplex the beams of DQPSK transmission light 5a further and transmit the resultant as a single 40-Gb/s optical signal 34a. Moreover, the 40-Gb/s optical signal 34b can be received without a polarization separator.

INDUSTRIAL APPLICABILITY

As has been described above, the optical transmission and reception system, the optical transmitting and receiving apparatus, and the optical transmission and reception method according to the present invention are useful for an optical transmitter-receiver that electrically multiplexes a plurality of tributary signals and transmits the resultant as a single light wavelength, and are particularly suited to an optical transmitter-receiver that multiplexes tributary signals of different rates.

REFERENCE SIGNS LIST

1a STM-64 signal
1b 10 GbE LAN PHY signal
2a, 2b XFP
3a, 3b FEC
4a 20G DQPSK MOD
4b 20G DQPSK REC
5a DQPSK transmission light
5b DQPSK reception light
6 rate conversion circuit
7 DQPSK PRECODER
8 TIM
9 Trib. SEL
11 QPSK Mapper
12a 20G QPSK MOD
12b 20G QPSK REC
13a QPSK transmission light
13b QPSK reception light
21-1 to 21-8 1 GbE signal
22-1 to 22-8 SFP
23 GFP
31 polarization multiplexer
32 LD offset count
33 optical splitter
34a, 34b 40-Gb/s optical signal

The invention claimed is:

1. An optical transmission and reception system including a transmitting apparatus for converting a plurality of tributary signals into a single beam of multilevel modulated light for transmission, and a receiving apparatus for receiving multilevel modulated light and converts it into a plurality of tributary signals,
the transmitting apparatus comprising:
a first circuitry comprising:
a forward error correction coder to apply error correction coding to each individual one of the tributary signals, the error correction coding including addition of a tributary identifier for identifying a tributary;
a transmitter side rate converter to perform rate conversion by adding predetermined data to the signals subjected to the error correction coding so that the signals have the same transmission rate; and
a multilevel modulator to convert the signals rate-converted by the transmission-side rate converter into a single beam of multilevel modulated light,
the receiving apparatus comprising:
a second circuitry comprising:
a multilevel modulated light receiver to receive multilevel modulated light, separate a received signal into tributary signals, and output the separated signals as received tributary signals to respective different output systems;
a reception-side rate converter to perform rate conversion by deleting the predetermined data from the received tributary signals;
an error correction decoder to perform error correction decoding on received tributary signals non-rate-converted by the reception-side rate converter or the received tributary signals rate-converted by the reception-side rate converter and extract the tributary identifiers from the received non-rate-converted tributary signals or the received rate-converted tributary signals in respective different output systems;
a tributary detector to retain tributary identifiers defined for the respective output systems in advance as output system tributary identifiers, compare the output system tributary identifier of each output system with the tributary identifier that is extracted from the received tributary signal output to the output system, and make a notification as to a match or mismatch as a result of comparison;
a tributary selector to give an instruction to change correspondence between the received tributary signals and the output systems if the result of comparison is a mismatch, and
the multilevel modulated light receiver changing the correspondence between the received tributary signals to output and the output systems based on the instruction from the tributary selector.

2. An optical transmission and reception system including a first transmitting apparatus and a second transmitting apparatus each of which is a transmitting apparatus for converting a plurality of tributary signals into a single beam of multilevel modulated light for transmission, and a first receiving apparatus and a second receiving apparatus each of which is a receiving apparatus for receiving multilevel modulated light and converts it into a plurality of tributary signals, the optical transmission and reception system comprising:
a first circuitry comprising,
a polarization multiplexer to multiplex the multilevel modulated light transmitted by the first transmitting apparatus and the multilevel modulated light transmitted by the second transmitting apparatus so that the beams of multilevel modulated light are polarized orthogonal to each other, and to transmit the resultant as a multiplexed signal,
a frequency offset controller to control to a predetermined value a difference in wavelength between the multilevel modulated light transmitted by the first transmitting apparatus and the multilevel modulated light transmitted by the second transmitting apparatus, and
when receiving a multiplexed signal, an optical splitter to split the multiplexed signal and to output the split signals to the first receiving apparatus and the second receiving apparatus, respectively;
each transmitting apparatus comprising,
a second circuitry comprising,
an error correction coder to apply error correction coding to each individual one of the tributary signals, the error correction coding including addition of a tributary identifier for identifying a tributary,
a transmission-side rate converter to perform rate conversion by adding predetermined data to the signals given the error correction coding so that the signals have the same transmission rate, and
a multilevel modulator to convert the signals rate-converted by the transmission-side rate converter into a single beam of multilevel modulated light;
each receiving apparatus comprising,
a third circuitry comprising,
a multilevel modulated light receiver to receive multilevel modulated light, separate a received signal into tributary signals, and output the separated signals as received tributary signals to respective different output systems,
a reception-side rate converter to perform rate conversion by deleting the predetermined data from the received tributary signals, an error correction decoder to perform error correction decoding on received tributary signals non-rate-converted by the reception-side rate converter or the received tributary signals rate-converted by the reception-side rate converter and extract the tributary identifiers from the received non-rate-converted tributary signals or the received rate converted tributary signals in respective different output systems, a tributary detector to retain tributary identifiers defined for the respective output systems in advance as output system tributary identifiers, compare the output system tributary identifier of each output system with the tributary identifier that is extracted from the received tributary signal output to the output system, and make a notification as to a match or mismatch as a result of comparison, a tributary selector to give an instruction to change correspondence between the received tributary signals and the output systems if the result of comparison is a mismatch, and the multilevel modulated light receiver changing the correspondence between the received tributary signals to output and the output systems based on the instruction from the tributary selector.

3. The optical transmission and reception system according to claim 1, wherein with one of the tributary signals that has a maximum transmission rate as a fastest tributary signal, the reception-side rate converter adds the predetermined data to the tributary signal other than the fastest tributary signal so that the tributary signal other than the fastest tributary signal has the same transmission rate as that of the fastest tributary signal, and treats the fastest tributary signal as a rate-converted tributary signal without adding the predetermined data.

4. The optical transmission and reception system according to claim 3, wherein the multilevel modulated light receiver outputs a reception-side tributary signal that is to be output to the output system corresponding to the output system tributary identifier that represents the fastest tributary signal, to the error correction decoder as a rate-converted reception-side tributary signal without intervention of the reception-side rate converter.

5. The optical transmission and reception system according to claim 1, wherein the multilevel modulated light is differential quadrature phase shift keying light.

6. The optical transmission and reception system according to claim 2, wherein the multilevel modulated light is differential quadrature phase shift keying light.

7. The optical transmission and reception system according to claim 3, wherein the multilevel modulated light is differential quadrature phase shift keying light.

8. The optical transmission and reception system according to claim 4, wherein the multilevel modulated light is differential quadrature phase shift keying light.

9. The optical transmission and reception system according to claim 1, wherein the multilevel modulated light is quadrature phase shift keying light.

10. The optical transmission and reception system according to claim 2, wherein the multilevel modulated light is quadrature phase shift keying light.

11. The optical transmission and reception system according to claim 3, wherein the multilevel modulated light is quadrature phase shift keying light.

12. The optical transmission and reception system according to claim 4, wherein the multilevel modulated light is quadrature phase shift keying light.

13. The optical transmission and reception system according to claim 1, wherein at least one of the tributary signals is used as an STM-64 signal, and at least one of the tributary signals is used as a 10-Gigabit Ethernet signal.

14. The optical transmission and reception system according to claim 1, wherein the tributary signals are used as multiplexed signals of two or more low-rate signals.

15. The optical transmission and reception system according to claim 14, wherein the low-rate signals are used as 1-Gigabit Ethernet signals, and the multiplexed signals are used as GFP multiplex signals.

16. The optical transmission and reception system according to claim 1, wherein Trace Identifier Mismatch standardized by the ITU-T is used as the tributary identifier.

17. The optical transmission and reception system according to claim 13, wherein Trace Identifier Mismatch standardized by the ITU-T is used as the tributary identifier.

18. The optical transmission and reception system according to claim 14, wherein Trace Identifier Mismatch standardized by the ITU-T is used as the tributary identifier.

19. The optical transmission and reception system according to claim 15, wherein Trace Identifier Mismatch standardized by the ITU-T is used as the tributary identifier.

20. An optical transmission and reception method of an optical transmission and reception system, the system including a transmitting apparatus for converting a plurality of tributary signals into a single beam of multilevel modulated light for transmission and an optical receiving apparatus whose receiving apparatus receives multilevel modulated light and converts it into a plurality of tributary signals, the method comprising:

performing error correction coding, using a circuitry, to cause the transmitting apparatus to apply error correction coding to each individual one of the tributary signals, the error correction coding including addition of a tributary identifier for identifying a tributary;

performing transmission-side rate conversion, using the circuitry, to cause the transmitting apparatus to perform rate conversion by adding predetermined data to the signals given the error correction coding so that the signals have the same transmission rate;

performing multilevel modulation, using the circuitry, to cause the transmitting apparatus to convert the signals rate-converted in the transmission-side rate conversion into a single beam of multilevel modulated light;

receiving multilevel modulated light, using the circuitry, to cause the receiving apparatus to receive multilevel modulated light, separate a received signal into tributary signals, and output the separated signals as received tributary signals to respective different output systems;

performing reception-side rate conversion, using the circuitry, to cause the receiving apparatus to perform rate conversion by deleting the predetermined data from the received tributary signals;

performing error correction decoding, using the circuitry, to cause the receiving apparatus to perform error correction decoding on received tributary signals non-rate-converted in the reception-side rate conversion or the received tributary signals rate-converted in the reception-side rate conversion and extract the tributary identifiers from the received non-rate-converted tributary signals or the received rate-converted tributary signals in respective different output systems;

performing tributary detection, using the circuitry, to cause the receiving apparatus to retain tributary identifiers defined for the respective output systems in advance as output system tributary identifiers, compare the output system tributary identifier of each output system with the tributary identifier that is extracted from the received tributary signal output to the output system, and make a notification as to a match or mismatch as a result of comparison;

selecting a tributary, using the circuitry, to cause the receiving apparatus to give an instruction to change correspondence between the received tributary signals and the output systems if the result of comparison is a mismatch; and performing output change, using the circuitry, to cause the receiving apparatus to change the correspondence between the received tributary signals to output and the output systems based on the instruction.

21. The optical transmission and reception system according to claim 2, wherein at least one of the tributary signals is used as an STM-64 signal, and at least one of the tributary signals is used as a 10-Gigabit Ethernet signal.

22. The optical transmission and reception system according to claim 2, wherein the tributary signals are used as multiplexed signals of two or more low-rate signals.

23. The optical transmission and reception system according to claim 22, wherein the low-rate signals are used as 1-Gigabit Ethernet signals, and the multiplexed signals are used as GFP multiplex signals.

24. The optical transmission and reception system according to claim 2, wherein Trace Identifier Mismatch standardized by the ITU-T is used as the tributary identifier.

25. The optical transmission and reception system according to claim 21, wherein Trace Identifier Mismatch standardized by the ITU-T is used as the tributary identifier.

26. The optical transmission and reception system according to claim 22, wherein Trace Identifier Mismatch standardized by the ITU-T is used as the tributary identifier.

27. The optical transmission and reception system according to claim 23, wherein Trace Identifier Mismatch standardized by the ITU-T is used as the tributary identifier.

* * * * *